Jan. 23, 1962 E. Z. ZILAHY 3,018,006
ARTICLE TRANSFER MECHANISM
Filed Nov. 14, 1957 7 Sheets-Sheet 6
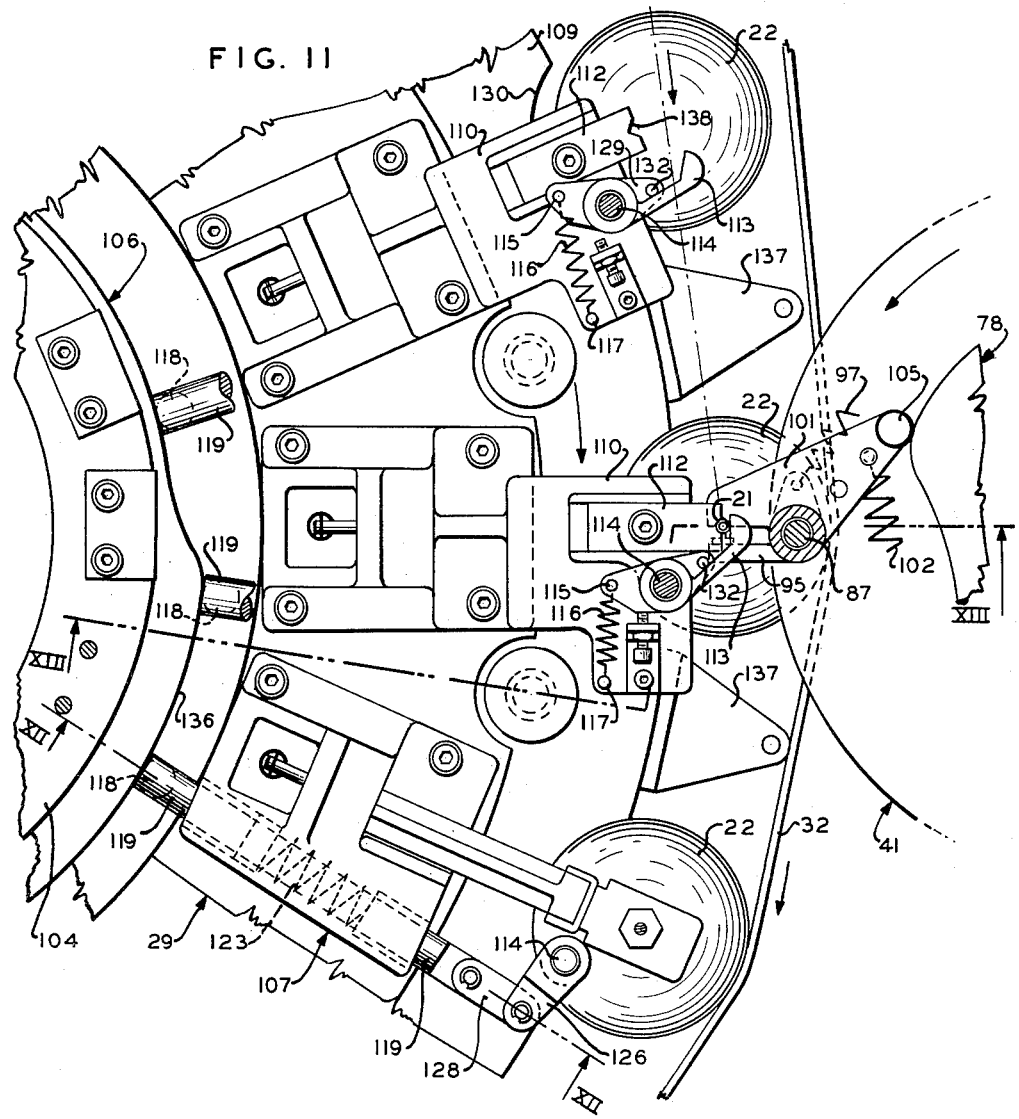
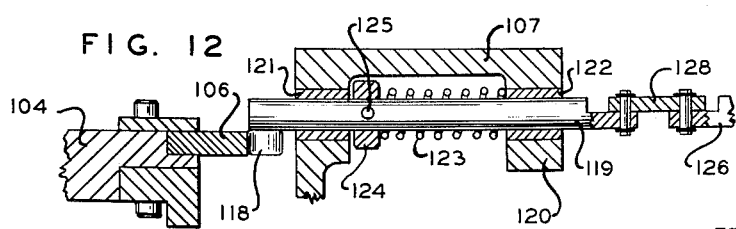
INVENTOR.
EDWARD Z ZILAHY
BY
Towson Price
ATTORNEY

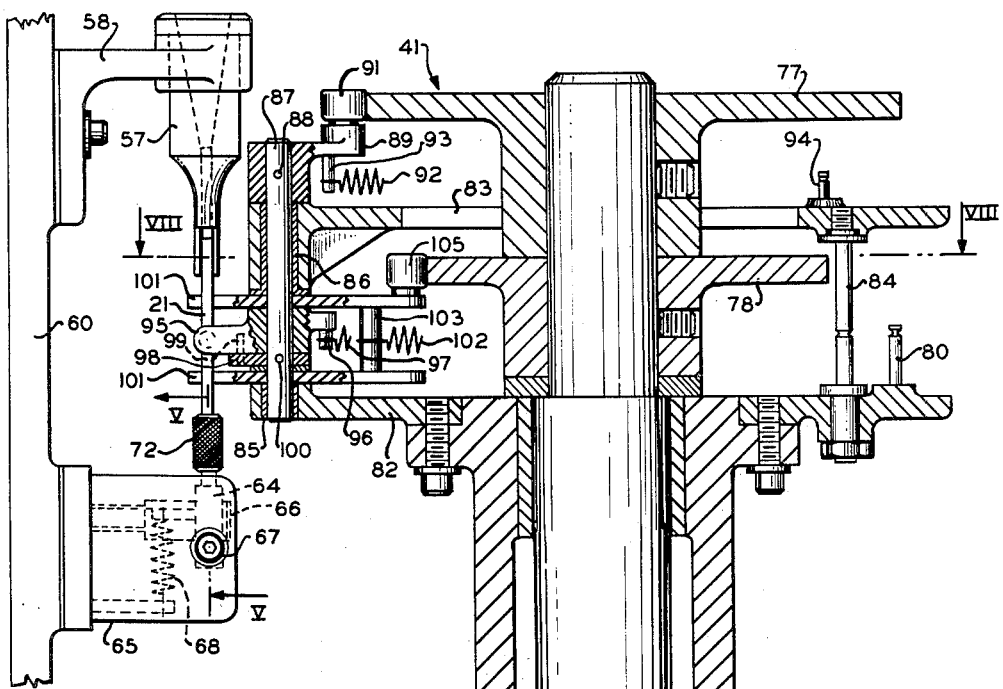
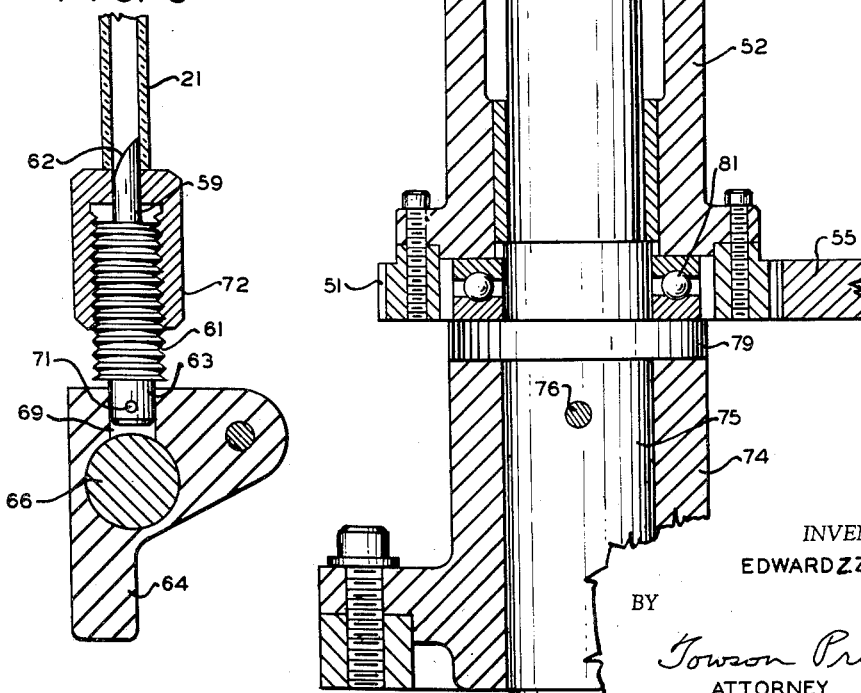

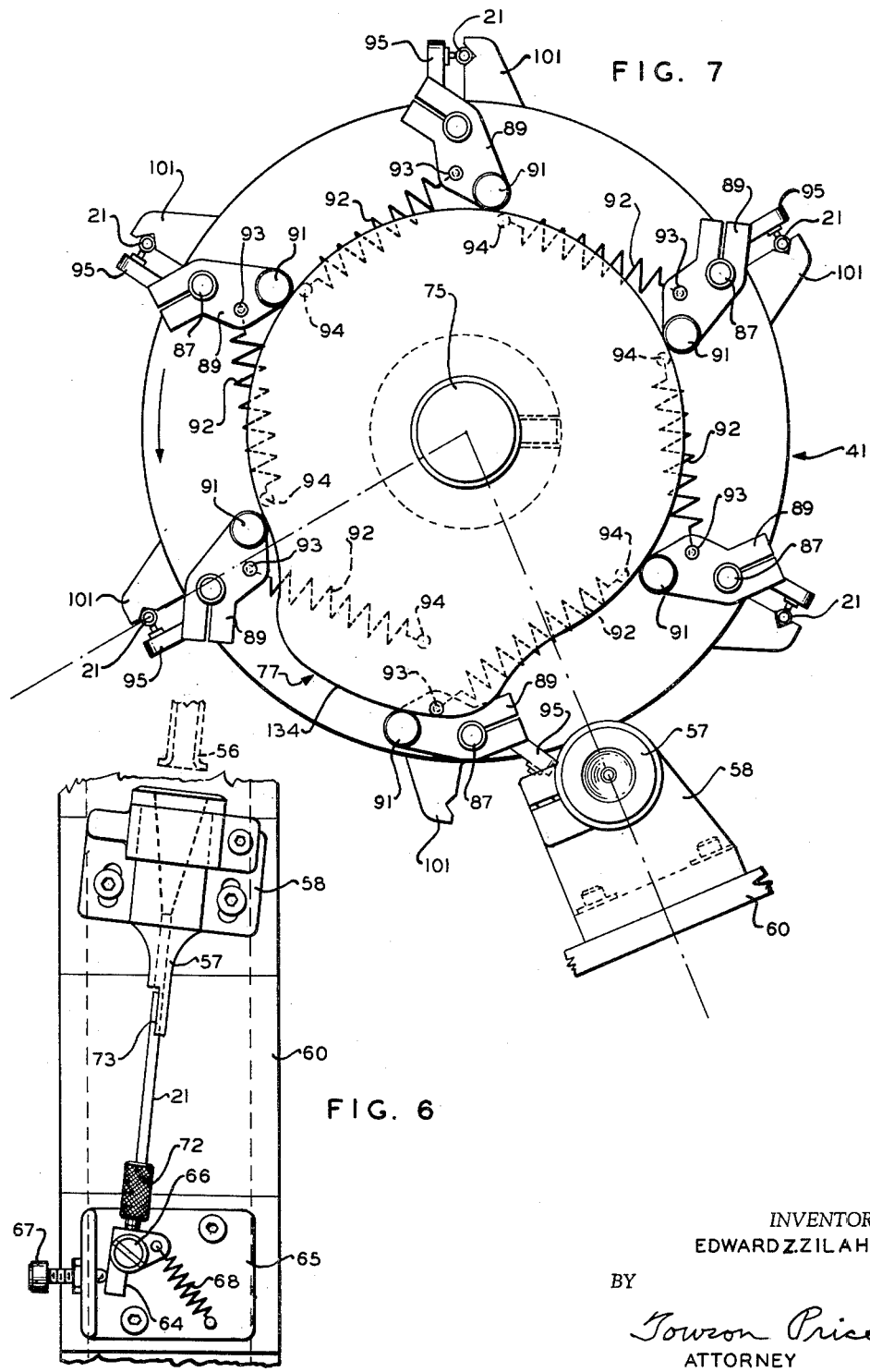

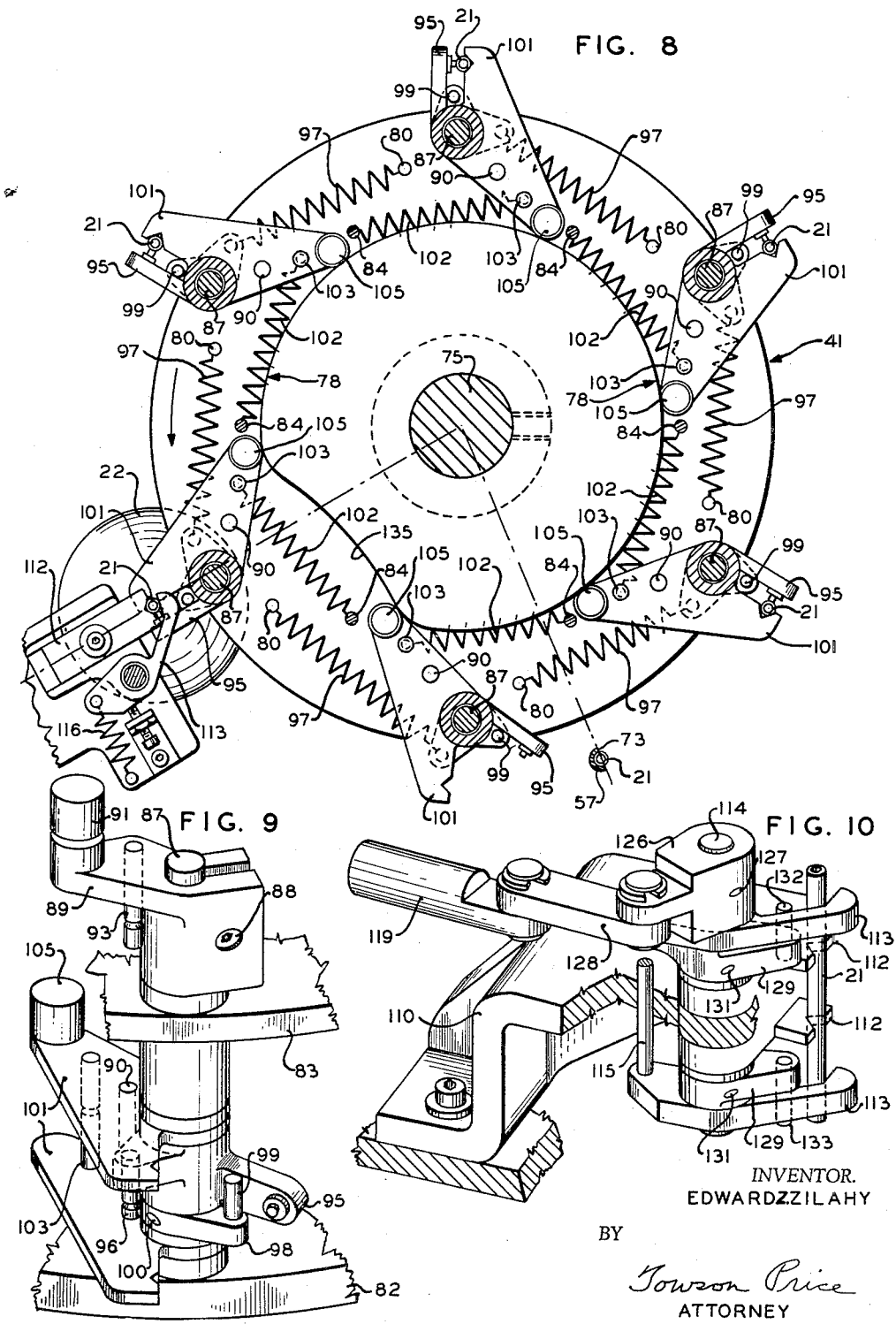

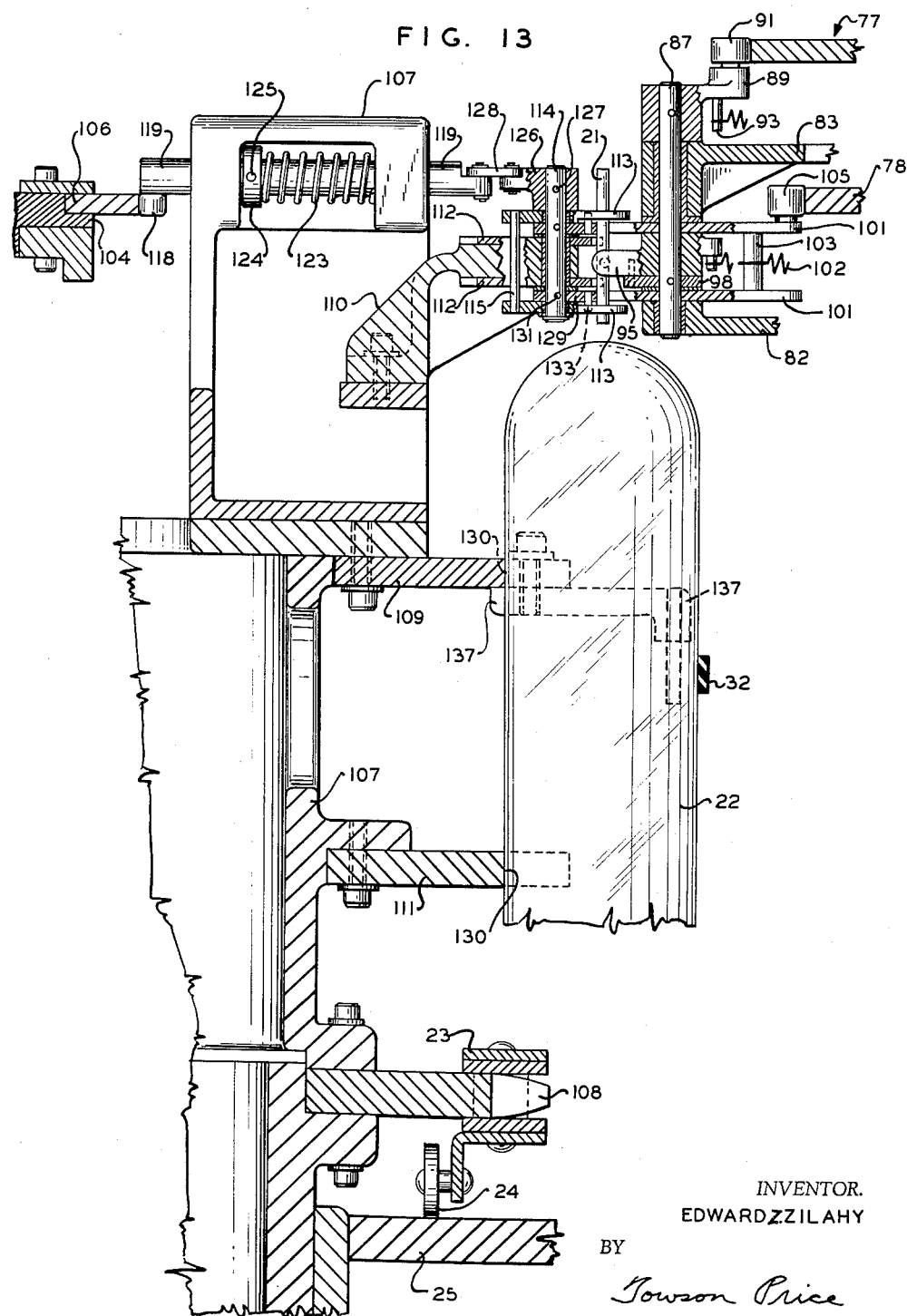

United States Patent Office 3,018,006
Patented Jan. 23, 1962

3,018,006
ARTICLE TRANSFER MECHANISM
Edward Z. Zilahy, Nutley, N.J., assignor to Standard Tool and Manufacturing Co., Kearney, N.J., a corporation of New Jersey
Filed Nov. 14, 1957, Ser. No. 696,482
15 Claims. (Cl. 214—1)

This invention relates to article transfer mechanism and, more particularly, to such for taking cylindrical articles, such as glass tubes, of substantially uniform length and diameter, from a hopper feed by means of a first carriage or transfer turret, carrying them around and delivering them one by one to a second carriage or chucking turret where desired operations may be performed thereon, such for example, as the securing of such tubes to glass envelopes or containers.

The trend in modern automatic machines is to have the parts move continuously, that is, without alternately stopping and starting. Many machines have been produced and are in operation which transport articles a certain distance and then stop or index, whereupon the travel is continued to another indexing position for a repetition of the operation. In accordance with my invention, glass tubes or other articles are automatically delivered after upending at a selected location, as from a hopper by conventional feeding means. The tubes, as they are placed, are picked up one by one by means carried by a first carriage or transfer turret, carried around or transported circumferentially by said transfer turret, and then deliveed to a second carriage or chucking turret, which, while both carriages are continuously rotating, picks the tubes up and carries them circumferentially therewith for the desired processing and subsequent discharge from the machine.

An object of my invention is the provision of article transfer mechanism comprising a first carriage, gripping devices mounted on said carriage for rotation therewith, means for automatically operating said gripping devices during carriage rotation to pick up positioned articles one at a time, a second carriage mounted for rotation about a vertical axis, means carried by said second carriage for holding articles delivered by said first carriage and means for automatically actuating said holding means, said second carriage being so positioned with respect to said first carriage that, during rotation, articles are presented by said first carriage one at a time to the article holding means of said second carriage while said holding means grip the articles and carry them therewith, including means for driving all of said mechanism in synchronism.

Another object of my invention is to provide glass tube transfer mechanism comprising a hopper device for upending said glass tubes and delivering them one at a time to a selected position, a transfer turret mounted for rotation about a vertical axis with inner and outer grip fingers disposed circumferentially on said turret, a first fixed cam for operating the inner grip fingers and a second for operating the outer grip fingers as the turret rotates, said turret being so positioned with respect to the hopper device that, during its rotation, its fingers take positioned tubes one at a time and transport them therearound, a chucking turret also mounted for rotation about a vertical axis, sets of locating slides and fingers disposed circumferentially on said chucking turret, a third fixed cam for operating said fingers during rotation of said chucking turret, with the latter so positioned with respect to said transfer turret that, during rotation, tubes are pressed by said transfer turret one at a time against a locating slide, and a chucking turret finger presses such a tube into position against said slide and carries it therewith, including means for driving all of said mechanism in synchronism.

A further object of my invention is to provide a method of transferring articles of substantially uniform length and diameter from a hopper to processing means, comprising discharging said articles one by one from said hopper while upending them therebeneath, gripping said articles one by one and carrying them around a circle, and grasping said gripped articles and carrying them at about the same speed around another circle tangent to the first circle while processing them, all transporting of said upended articles being as one continuous movement.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 4 is an enlarged vertical sectional view on the line IV—IV of FIGURE 1, in the direction of the arrows.

FIGURE 5 is further enlarged fragmentary vertical sectional view on the line V—V of FIGURE 4, in the direction of the arrows.

FIGURE 6 is an enlarged elevational view of the mechanism which receives tubes from the hopper, in the direction of the arrows on the line VI—VI of FIGURE 1.

FIGURE 7 is a plan of the transfer turret illustrated in FIGURE 4.

FIGURE 8 is a partial plan and a partial horizontal sectional view on the line VIII—VIII of FIGURE 4, in the direction of the arrows.

FIGURE 9 is a fragmentary perspective view of one set of inner and outer grip fingers and associated parts of the transfer turret.

FIGURE 10 is a fragmentary perspective view of one set of locating slides, their chuck fingers and associated parts of the chucking turret.

FIGURE 11 is a fragmentary plan of the chucking turret and adjacent parts of the transfer turret as it appears in FIGURE 8.

FIGURE 12 is a fragmentary vertical sectional view on the line XII—XII of FIGURE 11, in the direction of the arrows.

FIGURE 13 is a vertical sectional view on the line XIII—XIII of FIGURE 11, in the direction of the arrows.

Figure 1:
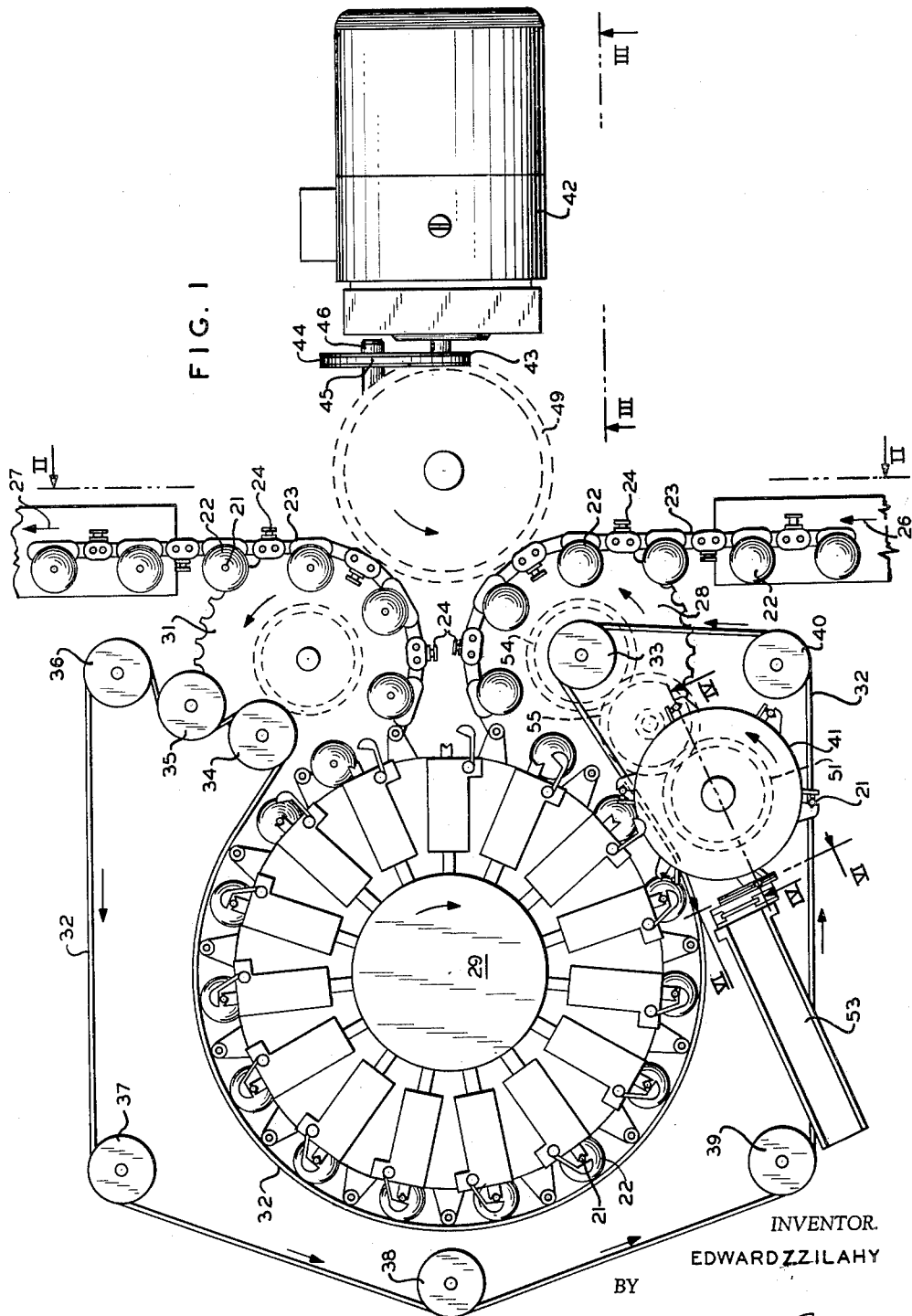
FIGURE 1 is an outline plan of a machine embodying my invention.
Figure 2:
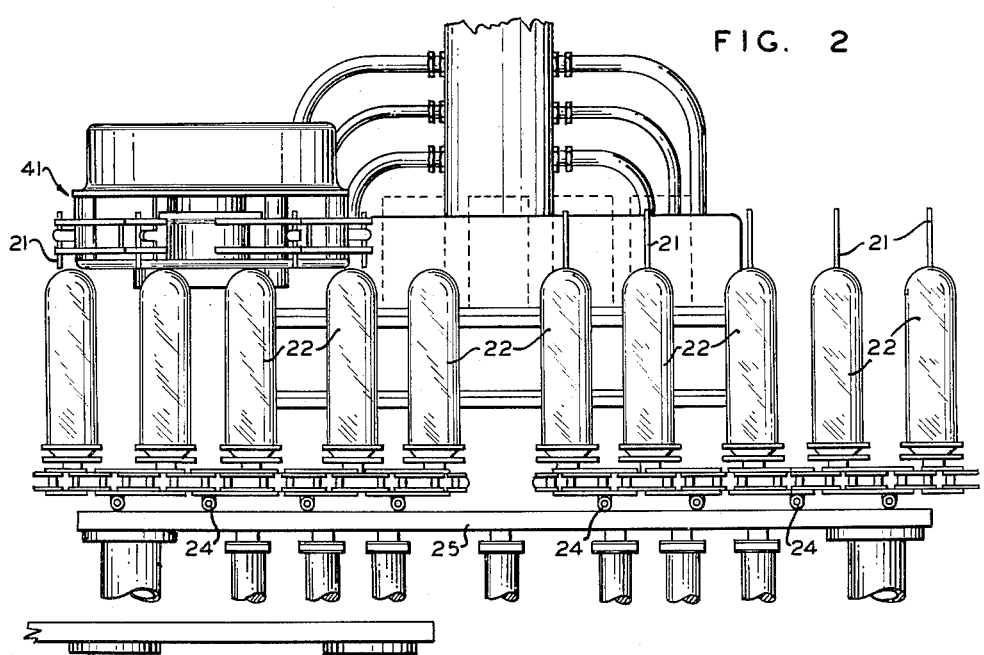
FIGURE 2 is a fragmentary elevational view of the machine from the right, as indicated by the arrows on the line II—II of FIGURE 1.
Figure 3:
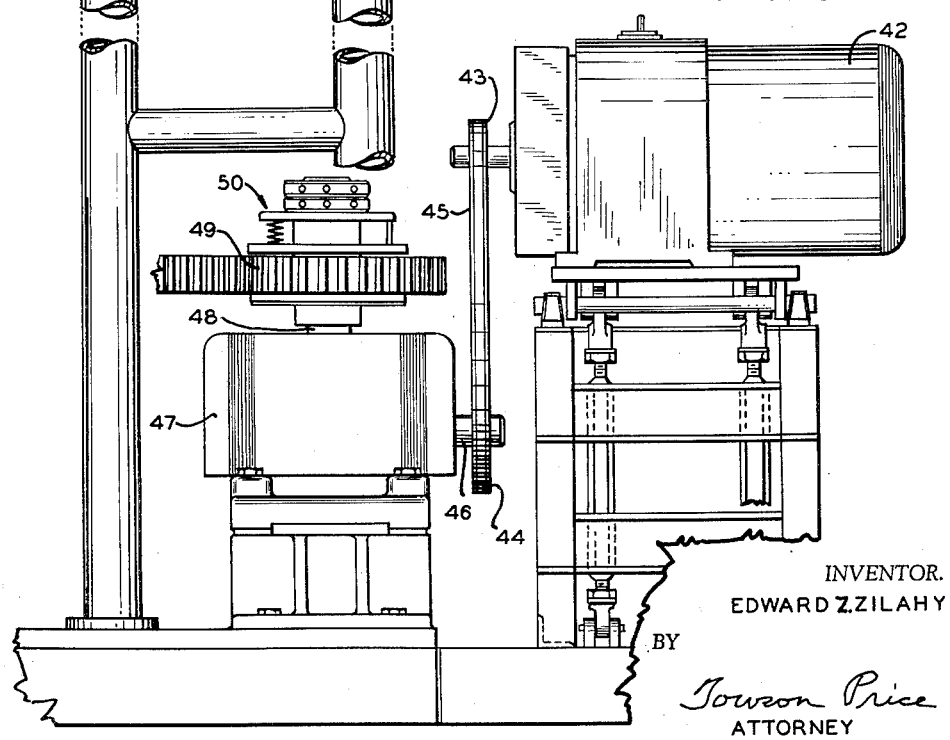
FIGURE 3 is an elevational view at right angles to the view of FIGURE 2, or generally in the direction of the arrows on the line III—III of FIGURE 1.

Referring to the drawings in detail and first considering FIGURES 1, 2 and 3, there is shown an embodiment of my invention illustrative but not limiting, particularly adapted for connecting glass exhaust tubes 21 to the tops of the glass envelopes 22 which may be such doubled-walled glass devices as are generally called thermos bottles. The envelopes 22 may be transported into and out of the machine by means of a chain device 23, including rollers 24 riding on a suitable track 25. This chain device, as will be seen most clearly in FIGURE 1, passes into the machine in the direction of the arrow 26, and out of the machine in the direction of arrow 27. After passing around a drum 28, the chain device 23 passes around the chucking turret 29, around a drum 31, and then out of the machine. It will be understood that the carrying chain may be continuous and revert upon itself, although the parts carrying the chain, and which lie beyond the machine, are not shown.

While in the chucking turret 29, the glass envelopes 22 may be securely held in place by means of a belt 32 which passes around idler pulleys 33, 34, 35, 36, 37, 38, 39 and 40. The drive means for the chucking turret 29, the transfer turret 41, and the drums 28 and 31, comprise an electric motor 42, the armature shaft of which carries a pulley 43, around which and a gear box pulley 44 passes a drive belt 45. The pulley 44 is mounted on a shaft 46 projecting from a gear box 47, containing suitable gearing, and from which also projects a vertical shaft 48 frictionally operating a drive gear 49 through suitable slip-clutch mechanism 50.

In series with the drive gear 49, are suitable gears, not disclosed in detail, for driving the drum 28. Fixed with respect to said drum 28 is a gear 54 which drives the gear 51 (FIGURE 4), fixed on the drive housing 52 of the transfer turret 41, through idler gear 55. The gear 49 also drives the chucking turret 29 through suitable gearing. There is also suitable drive means, not shown, for operating the automatic hopper device 53 to upend and feed cylindrical articles, such as glass tubes of substantially uniform length and diameter, to a selected position, so that they may one by one be gripped by holding devices on the transfer turret 41, and transported to holding devices on the chucking turret 29 at desired positions above the glass envelopes 22 or other devices to which they are to be connected or otherwise processed. In FIGURE 2, the work pieces or glass envelopes 22 at the left are illustrated prior to connection of exhaust tubes 21 thereto, while those at the right are illustrated as they pass from the chucking turret with connected exhaust tubes.

*Preparing articles for reception by the transfer turret*

As illustrated in FIGURES 1 and 4 to 7, inclusive, conventional operating mechanism upends tubes of substantially uniform length and diameter in the hopper device 53 and delivers them upended through the lower end portion of a funnel-like part terminating in an outlet portion 56 to a tube throat or guide device 57 carried by an adjustable mounting bracket 58 on a frame portion 60, beneath the hopper 53. Each tube 21 is then caught on a swivel pin stud 59, formed as a threaded intermediate or body portion 61, an upstanding pointed or arcuately beveled portion 62 around which the tube is received, and a desirably chamfered cylindrical depending portion 63.

A swivel block 64 is pivotally carried on a bracket 65, as by means of a pin 66, and pulled clockwise to an adjusted position against a set screw 67 by means of a coil spring 68. The depending portion 63 of the swivel pin stud 59 is received in an upwardly opening aperture 69 in said block 64, and held in place by suitable means such as a pin 71.

The arcuately beveled portion 62 of the stud 59 is what is received in the lower end of each tube 21. If non-hollow articles were to be transported, the stud would be correspondingly socketed to receive the lower ends thereof. The amount of penetration of said beveled portion in each tube is adjusted by a sleeve 72, threadably engaging the body portion 61 and upon turning thereon serving to shroud more or less of the beveled portion 62. The sleeve acts as a stop for the lower end of each tube or other article 21. The lower end of the tube throat 57 is cut away, as indicated at 73, so that it supports each tube in a position, inclined slightly to the right from the bottom of the tube, at only the right side so that the tube may be gripped and readily removed to the left by the inner and outer grip fingers of the transfer turret, as will now be described.

*Transfer turret*

Referring now to FIGURES 4, 7, 8, 9, 11 and 13, there are shown the details of the transfer turret or carriage 41. This turret is supported on a pedestal 74 fixedly carrying a shaft 75, as by being secured thereto by a pin or screw 76. This shaft fixedly carries at its upper end an inner grip finger cam 77 and, therebeneath, an outer grip finger cam 78. The shaft 75 may be provided with a collar 79 carrying a roller bearing 81 which in turn rotatably carries the drive housing 52 and its gear 51. The drive housing 52 carries a lower support 82 secured thereto as by means of bolts or the like, which in turn carries an upper support 83 as by means of spacers 84. Rotatably mounted in lower support bearings 85 and co-axially disposed upper support bearings 86, is a series of shafts 87, in this instance six, spaced circumferentially around the supports 82 and 83.

Each shaft 87 has secured to its upper end, as by means of a pin or screw 88, an actuating arm 89 rotatably carrying at its end a roller 91 held in engagement with the cam 77 as by means of a helical tension spring 92. Said spring acts between a stud 93, depending from the arm 89, and a fixed stud 94 which may upstand from the upper support 83. Rotatably mounted on each shaft 87 is an inner grip finger 95, one end portion of which is adapted to grippingly engage a tube 21, and the opposite end portion of which has a depending stud 96, connected to one end of a coil tension spring 97 which resiliently urges said finger 95 into engagement with a carried tube 21. The other end of each spring 97 is anchored to a stud 80.

Operation of the finger 95 is effected by means of a drive spacer 98 having an upstanding stud 99 engaging the inner side of said finger. As the supports 82 and 83 are turned by the gear 51 through the carrying housing 52, the cam 77 acts on the rollers 91 to move the drive spacers 98, through the shafts 87 to which they are connected as by means of pins 100, and through said spacers move each finger 95 from the engaged tube 21 against the action of the tension springs 97, or allow it to be pulled by its spring 97 into engagement with a tube.

Each of the shafts 87 also carries a pair of outer grip fingers 101 completing the sets of article-gripping devices, said fingers being united by a connecting brace 90, urged away from a tube 21 and the corresponding inner grip finger 95 by means of a coil tension spring 102. Each spring 102 acts between a post portion 103 assisting the brace 90 in connecting said outer grip fingers, and one of the spacers 84 which connects the supports 82 and 83. The upper of each outer grip finger 101 carries a roller 105 which is urged by the corresponding spring 102 into engagement with the cam 78. It will thus be seen that, as the supports 82 and 83 are rotated by the drive housing 52, the fingers carried on the shafts 87 thereof are operated by the cams 77 and 78 to at one place grip tubes 21, presented by the tube throat 57 and the swivel pin stud 59, and at another place release said tubes. Said tubes 21 are thus picked up, carried around the transfer turret 41, and released for being picked up by the chucking turret or carriage 29 in a manner which will now be described.

*Chucking turret*

Referring now to FIGURES 8 and 10 to 13, inclusive, there is shown the details of the chucking turret or carriage 29. This turret is supported on a pedestal 104 which in turn fixedly carries an operating cam 106. Rotatably mounted about the pedestal is a drive housing 107 carrying driving means such as a gear or sprocket 108, on which the chain 23 travels. The housing 107 may also have attached thereto, as by means of bolts or the like, locating plates 109 and 111 with radially-opening notches 130 for nesting the work pieces or glass envelopes 22 in place about said turret, while belt 32 holds them thereagainst as they are supported by rollers 24 on track 25. The plate 109 may carry brackets 137, portions of which are engageable by said belt between said work pieces.

The tubes 21 are accepted by the chucking turret 29 from the transfer turret 41 which may position them immediately above the supported work pieces or envelopes 22, as shown more clearly in FIGURES 11 and 13. The accepting means on the chuck turret comprises a series of sets of tube or article holders formed as paired locating plates or slides 112 each with a radially opening notch 138 for nesting a tube 21 or other accepted article, each pair held in position on a chuck support 110 secured to the drive housing 107, as by bolts or the like, and provided with pairs of chuck fingers 113 forming article-holding devices. After reception of the exhaust tubes 21 in said slides from the transfer turret grip fingers 95 and 101, said tubes are held in position in said slides by said chuck fingers 113.

Each pair of chuck fingers 113 is pivotally mounted on a shaft 114, a series of which, in this case fifteen, are uniformly spaced circumferentially around the chucking turret 29. Each shaft 114 is in turn journaled in the chuck support 110. The chuck fingers of each pair are tied together for simultaneous operation by a vertical brace or rod 115. These chuck fingers are biased, counter-clockwise as viewed in FIGURE 11, by coil tension springs 116 each acting between a rod 115 and a stud 117 upstanding from the base of the support 110, so that said fingers tend to grip an article or tube 21 and hold it in the corresponding locating slides 112. These pairs of chuck fingers 113 are moved away from the slides 112, or allowed to be drawn thereto by their springs, by the cam 106. A roller 118, pivotally carried adjacent the inner end of a chuck actuator shaft 119, for each pair of chuck fingers, is held in engagement with said cam 106 by a spring 123. This shaft 119 passes through bearings 121 and 122 in the drive housing 107 and is resiliently biased by said spring 123 so that its roller 118 engages the cam 106. The coil compression spring 123 acts between a collar 124 secured to said actuator shaft 119 as by means of a pin 125, and a depending flange or web portion 120 of the drive housing 107.

The outer end of each actuator shaft 119 is operably connected to an actuating arm 126 which is fixed on a shaft 114, as by means of a pin or set screw 127, through a link 128. The ends of each link 128 are respectively pivoted to the outer end of a shaft 119 and the outer end portion of an arm 126. A pair of drive spacers 129 are fixed on each shaft 114, as by means of pins or set screws 131. The upper of each pair of drive spacers 129 carries an upstanding stud 132 normally engaged by the inner side of the upper of a pair of chuck fingers 113, while the lower of each pair of drive spacers 129 carries a depending stud 133 normally engaged by the inner side of the lower of the pair of chuck fingers 113. This means that as the drive housing 107 rotates about the chuck turret pedestal 104, the cam 106 effects movement of the chuck actuator shafts 119, to either move the chuck fingers 113 from tubes 21 gripped thereby against their locating slides 112, or release said chuck fingers to allow them to be pulled into engagement with said tubes by their springs 116.

Summary of operations

From the foregoing disclosure, it will be seen that glass tubes 21, adapted to have exhaust purposes, or other such articles, may be automatically delivered at a selected stationary location, that is, through the tube throat 57 where they are supported on a swivel pin stud 59. The construction of said tube throat and swivel pin stud, and the swivel mounting of the latter, is such that each tube may be picked up by inner and outer grip fingers of a set of said fingers on a transfer turret or carriage 41, during continuous rotation thereof.

Specifically, a set of said fingers approaches a tube 21 while in supported position, indicated by the set to the left of said tube 21 as view the FIGURES 7 and 8. This supported position is such that, as controlled by the high dwell portion 134 on the cam 77, the inner finger 95 of said set is rotated sufficiently inward so that it clears said tube on approaching it. Immediately after it passes the tube 21, its actuating roller 91 runs down from said high dwell 134 onto the remainder or cam portion of uniform diameter, to cause said inner finger 95 to immediately move to the right of the tube 21 to grip it.

At the same time the outer grip fingers 101 have previously been moved to open position, by their actuating rollers 105 passing into the low dwell portion 135 of their actuating cam 78, a tube 21 having thereby been released to a pair of chucking turret fingers 113 and their slides 112. Just prior to engagement with said tube 21 to be received from the swivel pin stud 59, these fingers are in position to close about and with the assistance of the corresponding inner grip finger 95, take a tube 21 from the tube throat 57 and said stud. Taking said tube from the throat and stud is permitted by the pivotal mounting of the swivel block 64 which is retained in the normal position illustrated in FIGURE 6 by the spring 68, but is allowed to rotate, in a counter-clockwise direction as viewed in FIGURES 5 and 6, upon the tube being gripped by the fingers 95 and 101 and carried along by the transfer turret to the position where said carried tube is placed in a pair of locating slides on the chucking turret, while moving simultaneously with said transfer turret.

It will be seen that as the fingers of the transfer turret register with a pair of slides 112 of the chucking turret, the associated chuck fingers 113 are being allowed to close by the roller 118 reaching the high dwell portion 136 of the cam 106. The roller 105 of the outer grip fingers 101 is at this time reaching the low dwell portion 135 of its cam 78 so that, as the chuck fingers 113 close on a tube held in the transfer turret fingers, the outer grip fingers of said transfer turret simultaneously release said tube and the spring 97 of the associated inner grip finger 95 may, if necessary, give a little to allow it to be taken by the chuck fingers 113 of said chucking turret 29. It will, therefore, be seen that the tubes are simultaneously picked up as they are delivered one by one from the hopper 53, and carried around a circle by the transfer turret and, without any stoppage of the mechanism, the tubes 21 or other articles carried by the transfer turret 41, are then delivered to the chuck fingers of the chucking turret, which fingers hold said tubes in place with respect to work pieces, such as glass envelopes 22, while carrying them around a circle tangent to said first-mentioned circle at about the same linear speed, while they are connected to said envelopes or otherwise processed by mechanism only fragmentarily illustrated because it is not part of the invention here claimed.

By virtue of the resilient gripping of the articles 21 by the inner grip fingers 95, actuated by their springs 97, instead of positively, and the resilient gripping of such articles by the chuck fingers 113, as said fingers are allowed to close under the influence of their actuating springs 116, a certain variation in diameter of said articles is allowed for. Thus, while still insuring that each article is gripped with sufficient force to properly hold it, destructive force, as might occur on an oversized article if the gripping thereof were positive rather than resilient, is avoided.

Having now described my invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:
1. In article transfer mechanism, means for holding articles of substantially uniform length and diameter, in position for being picked up for transfer by said mecha- nism, comprising an adjustably mounted guide device, a hopper thereabove, mechanism for feeding one by one such articles upended from said hopper to said guide device, a swivel pin stud formed as an upstanding portion adapted to interfit with respect to the lower end of each of said articles and a depending cylindrical portion, a swivel block pivotally carried beneath and holding the depending portion of said stud, a spring biasing said block to an adjusted position against a stop and means to adjustably shroud a portion thereof and act as a stop for the lower end portion of an article resting thereon, the lower end portion of said guide device being cut away so that it supports each article at only one side, so that the article may be gripped and readily removed at said cut-away portion by virtue of the swivel support of the stud.

2. In article transfer mechanism, means for holding hollow articles of substantially uniform length and diameter, in position for being picked up for transfer by said mechanism, comprising an adjustably mounted tube throat, a hopper thereabove, mechanism for feeding one by one such articles upended from said hopper to said throat, a swivel pin stud formed as a threaded intermediate body portion, an upstanding beveled portion around which each of said articles is received, and a chamfered depending cylindrical portion, a swivel block pivotally carried beneath and holding the depending portion of said stud, a coil spring biasing said block to an adjusted position, a set screw determining said position by engaging a side of said block when pulled thereagainst by said spring, and a sleeve threadably engaging the body portion of said stud to adjustably shroud a portion thereof and act as a stop for the lower end portion of an article resting thereon, the lower end portion of said tube throat being cut away so that it supports each article, in a position inclined slightly from the vertical, at only the side toward which it is upwardly inclined, so that the article may be gripped and readily removed at said cut-away portion by virtue of the swivel support of the stud.

3. In article transfer mechanism, means for alternately gripping and releasing articles of substantially uniform length and diameter, comprising a fixed inner grip finger cam, a fixed outer grip finger cam, a drive housing rotatably mounted, a lower support carried at the upper end of said housing, an upper support carried above said lower support, a series of rotatable shafts mounted in coaxially disposed bearings in said supports, an actuating arm secured to the upper end of each of said rotatable shafts, a roller rotatably mounted on each arm, resilient means urging each arm to turn one way for holding its roller in engagement with said inner grip finger cam, an inner grip finger rotatably mounted on each shaft between said supports, means to resiliently urge each inner grip finger to turn the other way for engagement with an article to be picked up by said mechanism, a drive spacer fixed on each of said rotatable shafts, means on each spacer normally engaging the side of the associated finger toward which it is urged by its resilient means, means for turning said drive housing to cause said inner grip finger cam to act on said arm rollers, move the drive spacers through their shafts, and thereby move each finger from a carried article against the action of its resilient urging means, a pair of outer grip fingers rotatably mounted on each rotatable shaft for each inner grip finger, each pair being united by a connecting brace and urged away from the corresponding inner grip finger by resilient means, a roller carried by each pair of outer grip fingers and by said resilient means urged into engagement with said outer grip finger cam, so that as the supports are rotated by the drive housing, said fingers are operated to at one place grip articles as presented thereto and at another place release them.

4. In article transfer mechanism, means for alternately gripping and releasing articles of substantially uniform length and diameter, comprising a transfer turret having a supporting pedestal, a shaft fixed to and upstanding from said pedestal, an inner grip finger cam secured to the upper end portion of said fixed shaft, an outer grip finger cam secured to said fixed shaft beneath said inner grip finger cam, a drive housing rotatably mounted on said fixed shaft, a lower support carried at the upper end of said housing, an upper support carried above said lower support by means of spacers, a series of rotatable shafts mounted in coaxially disposed bearings in said supports, an actuating arm secured to the upper end of each of said rotatable shafts, a roller rotatably mounted on each arm, a helical tension spring urging each arm to turn one way for holding its roller in engagement with said inner grip finger cam, an inner grip finger rotatably mounted on each shaft between said supports, means to resiliently urge each inner grip finger to turn the other way for engagement with an article to be picked up by said mechanism, a drive spacer fixed on each of said rotatable shafts, an upstanding stud on each spacer normally engaging the side of the associated finger toward which it is urged by its resilient means, means for turning said drive housing to cause said inner grip finger cam to act on said arm rollers, move the drive spacers through their shafts, and thereby move each finger from a carried article against the action of its resilient urging means, a pair of outer grip fingers rotatably mounted on each rotatable shaft for each inner grip finger, each pair being united by a connecting brace and urged away from the corresponding inner grip finger by resilient means, a roller carried by each pair of outer grip fingers and by said resilient means urged into engagement with said outer grip finger cam, so that as the supports are rotated by the drive housing, said fingers are operated to at one place grip articles as presented thereto and at another place release them.

5. In article transfer mechanism, means for alternately gripping and releasing articles of substantially uniform length and diameter, comprising a fixed operating cam, a drive housing rotatably mounted, means for driving said housing, a series of pairs of locating plates movable with said housing and presenting radially opening notches for nesting work pieces in place, belt means for holding said work pieces against said locating plates, means for accepting cylindrical articles of substantially uniform length and diameter from associated mechanism for processing with respect to said work pieces, said accepting means comprising a series of chuck supports carried by said drive housing, a pair of locating slides secured to each support, a series of vertical shafts each of which is journaled in a chuck support, chuck finger means pivoted to each of said shafts, resilient means biasing said chuck finger means toward said locating slides for holding an accepted article against each pair of said slides, means for by said cam actuating said chuck finger means away from said slides as desired, comprising a corresponding series of chuck actuator shafts, coaxial bearings for each shaft in said drive housing, means resiliently biasing each shaft toward said cam, a roller pivoted with respect to the inner end portion of each actuator shaft, an actuating arm secured to each shaft about which the chuck finger means are pivoted, means operatively connecting the outer end of each actuator shaft to the corresponding actuating arm, drive spacer means fixed to each shaft to which the chuck finger means are pivoted, means carried by the drive spacer means and normally engaged by the inner side of the corresponding chuck finger means, whereby as the drive housing rotates, the cam effects movement of the chuck actuator shafts to move the chuck finger means from articles gripped thereby against their locating slides or release said finger means to allow them to be pulled into engagement with accepted articles by the chuck finger biasing means.

6. In article transfer mechanism means for alternately gripping and releasing articles of substantially uniform length and diameter, comprising a chucking turret having a supporting pedestal, an operating cam fixedly carried thereon, a drive housing rotatably mounted on said pedestal, means for driving said housing, a series of pairs of locating plates movable with said housing and presenting radially opening notches for nesting work pieces in place about said housing, belt means for holding said work pieces against said locating plates, roller means operating on a track and geared to said drive housing for carrying said work pieces to, through and from said chucking turret, means for accepting cylindrical articles of substantially uniform length and diameter from associated mechanism for processing with respect to said work pieces, said accepting means comprising a series of chuck supports carried by said drive housing, a pair of locating slides secured to each support, a series of vertical shafts each of which is journaled in a chuck support, a pair of chuck fingers pivoted to each of said shafts, means tying the members of each pair of fingers together for simultaneous operation, resilient means biasing said chuck fingers toward said locating slides for holding an accepted article against each pair of said slides, means for by said cam actuating said chuck fingers away from said slides as desired, comprising a corresponding series of chuck actuator shafts, coaxial bearings for each shaft in said drive housing, means resiliently biasing each shaft toward said cam, a roller pivoted with respect to the inner end portion of each actuator shaft, an actuating arm secured to each shaft about which the chuck fingers are pivoted, a link operatively connecting the outer end of each actuator shaft to the corresponding actuating arm, a pair of drive spacers fixed to each shaft to which the chuck fingers are pivoted, an upstanding stud carried by the upper of each pair of drive spacers and normally engaged by the inner side of the upper of the corresponding pair of chuck fingers, a depending stud carried by the lower of each pair of drive spacers and normally engaged by the inner side of the lower of the corresponding pair of chuck fingers, whereby as the drive housing rotates about the chucking turret pedestal, the cam effects movement of the chuck actuator shafts to move the chuck fingers from articles gripped thereby against their locating slides or release said fingers to allow them to be pulled into engagement with accepted articles by the chuck finger biasing means.

7. Article transfer mechanism comprising means for presenting and holding articles of substantially uniform length and diameter, in position for being picked up for transfer by said mechanism, comprising an adjustably mounted guide device, a hopper thereabove, mechanism for upending and feeding, one-by-one, such articles from said hopper to said guide device, a swivel pin stud formed as an upstanding portion adapted to interfit with respect to the lower end of each of said articles and a depending cylindrical portion, a swivel block pivotally carried beneath and holding the depending portion of said stud, a spring biasing said block to an adjusted position against a stop and means to adjustably shroud a portion thereof and act as a stop for the lower end portion of an article resting thereon, the lower end of said guide device being cut away so that it supports each article at only one side, so that the article may be gripped and readily removed at said cut-away portion by virtue of the swivel support of the stud, a first carriage mounted for rotation about a vertical axis, article-gripping devices mounted on said carriage for rotation therewith, means for automatically operating said gripping devices during carriage rotation, said carriage being so positioned with respect to the feeding means that, during rotation of said carriage, its gripping devices take positioned articles, one at a time, and carry them around said carriage, a second carriage mounted for rotation about a vertical axis, an article holder and an article gripping device mounted on said second carriage for rotation therewith, means for automatically actuating said second carriage gripping device, said second carriage being so positioned with respect to said first carriage that, during rotation, articles are presented by said first carriage, one at a time, to said article holder while said second carriage gripping device presses such presented article against said holder and carries it therewith, and means for driving all of said mechanism in synchronism.

8. Article transfer mechanism comprising means for presenting, one at a time, and holding glass tubes at a selected position for being picked up for transfer by said mechanism, comprising an adjustably-mounted tube throat, a hopper thereabove, mechanism for upending and feeding one by one such articles from said hopper to said throat, a swivel pin stud formed as a threaded intermediate body portion, an upstanding beveled portion around which each of said articles is received, and a chamfered depending cylindrical portion, a swivel block pivotally carried beneath and holding the depending portion of said stud, a coil spring biasing said block to an adjusted position, a set screw determining said position by engaging a side of said block when pulled thereagainst by said spring, and a sleeve threadably engaging the body portion of said stud to adjustably shroud a portion thereof and act as a stop for the lower end portion of a tube resting thereon, the lower end portion of said tube throat being cut away so that it supports each tube in a position inclined slightly from the vertical, at only the side toward which it is upwardly inclined, so that the article may be gripped and readily removed at said cut-away portion by virtue of the swivel support of the stud, a transfer turret mounted for rotation about a vertical axis, sets of inner and outer grip fingers disposed circumferentially on said turret, a fixed cam for operating said inner grip fingers and one for operating said outer grip fingers during turret rotation, the turret being so positioned with respect to the swivel block that, during rotation of said turret, its fingers take positioned tubes one at a time and carry them around said turret, a chucking turret mounted for rotation about a vertical axis, sets of locating slides and fingers disposed circumferentially on said chucking turret, a third fixed cam for operating said fingers during rotation of said chucking turret, said chucking turret being so positioned with respect to said transfer turret that, during rotation, tubes are placed by said transfer turret one at a time against a locating slide and a chucking turret finger presses such a tube into position against said slide and carries it therewith, and means for driving all of said mechanism in synchronism.

9. Article transfer mechanism comprising a carriage mounted for rotation about a vertical axis, article-gripping devices mounted on said carriage as parts of means for alternately gripping and releasing articles of substantially uniform length and diameter, said means comprising a fixed inner grip finger cam, a fixed outer grip finger cam, a drive housing rotatably mounted, a lower support carried at the upper end of said housing, an upper support carried above said lower support, a series of rotatable shafts mounted in coaxially disposed bearings in said supports, an actuating arm secured to the upper end of each of said rotatable shafts, a roller rotatably mounted on each arm, resilient means urging each arm to turn one way for holding its roller in engagement with said inner grip finger cam, an inner grip finger rotatably mounted on each shaft between said supports, means to resiliently urge each inner grip finger to turn the other way for engagement with an article to be picked up by said mechanism, a drive spacer fixed on each of said rotatable shafts, means on each spacer normally engaging the side of the associated finger toward which it is urged by its resilient means, means for turning said drive housing to cause said inner grip finger cam to act on said arm rollers, move the drive spacers through their shafts, and thereby move each finger from a carried article against the action of its resilient urging means, a pair of outer grip fingers rotatably mounted on each rotatable shaft for each inner grip finger, each pair being united by a connecting brace and urged away from the corresponding inner grip finger by resilient means, and a roller carried by each pair of outer grip fingers and by said resilient means urged into engagement with said outer grip finger cam, so that as the supports are rotated by the drive housing, said fingers are operated to at one place grip articles as presented thereto and at another place release them.

10. Article transfer mechanism comprising a first carriage mounted for rotation about a vertical axis, article-gripping devices mounted on said carriage for rotation therewith, means for automatically operating said gripping devices during carriage rotation to take positioned articles, one at a time, and carry them around said carriage, a second carriage mounted for rotation about a vertical axis, accepted article holders and cooperating article-gripping devices mounted on the second carriage for rotation therewith as parts of means for alternately gripping and releasing articles presented thereto by said first carriage, said means comprising a fixed operating cam, a drive housing rotatably mounted, means for driving said housing, a series of chuck supports carried by said drive housing, a pair of adjustable locating slides secured to each support, a series of vertical shafts each of which is journaled in a chuck support, chuck finger means pivoted to each of said shafts, resilient means biasing said chuck finger means toward said locating slides for holding an accepted article against each pair of said slides, means for by said cam actuating said chuck finger means away from said slides as desired, comprising a corresponding series of chuck actuator shafts, coaxial bearings for each shaft in said drive housing, means resiliently biasing each shaft toward said cam, a roller pivoted with respect to the inner end portion of each actuator shaft, an actuating arm secured to each shaft about which the chuck finger means are pivoted, means operatively connecting the outer end of each actuator shaft to the corresponding actuating arm, drive spacer means fixed to each shaft to which the chuck finger means are pivoted, and means carried by the drive spacer means and normally engaged by the inner side of the corresponding chuck finger means, whereby as the drive housing rotates, the cam effects movement of the chuck actuator shafts to move the chuck finger means from articles gripped thereby against their locating slides or release said finger means to allow them to be pulled into engagement with accepted articles by the chuck finger biasing means.

11. Article transfer mechanism comprising a first carriage mounted for rotation about a vertical axis, means mounted on said carriage comprising a fixed inner grip finger cam, a fixed outer grip finger cam, a drive housing rotatably mounted, a lower support carried at the upper end of said housing, an upper support carried above said lower support, a series of rotatable shafts mounted in coaxially disposed bearings in said supports, an actuating arm secured to the upper end of each of said rotatable shafts, a roller rotatably mounted on each arm, resilient means urging each arm to turn one way for holding its roller in engagement with said inner grip finger cam, an inner grip finger rotatably mounted on each shaft between said supports, means to resiliently urge each inner grip finger to turn the other way for engagement with an article to be picked up by said mechanism, a drive spacer fixed on each of said rotatable shafts, means on each spacer normally engaging the side of the associated finger toward which it is urged by its resilient means, means for turning said drive housing to cause said inner grip finger cam to act on said arm rollers, move the drive spacers through their shafts, and thereby move each finger from a carried article against the action of its resilient urging means, a pair of outer grip fingers rotatably mounted on each rotatable shaft for each inner grip finger, each pair being united by a connecting brace and urged away from the corresponding inner grip finger by resilient means, a roller carried by each pair of outer grip fingers and by said resilient means urged into engagement with said outer grip finger cam, so that as the supports are rotated by the drive housing, said fingers are operated to at one place grip articles as presented thereto and at another place release them, a second carriage mounted for rotation about a vertical axis, article holders and cooperating article-gripping devices mounted on said second carriage for rotation therewith, means for automatically actuating said second carriage gripping devices, said second carriage being so positioned with respect to said first carriage that, during rotation, articles are presented by said first carriage, one at a time to a second carriage article holder while its gripping device presses such presented article against said article holder and carries it therewith, said second carriage also including a fixed operating cam, a drive housing rotatably mounted, means for driving said housing, a series of chuck supports carried by said drive housing, a pair of adjustable locating slides secured to each support, a series of vertical shafts each of which is journaled in a chuck support, chuck finger means pivoted to each of said shafts, resilient means biasing said chuck finger means toward said locating slides for holding an accepted article against each pair of said slides, means for by said cam actuating said chuck finger means away from said slides as desired, comprising a corresponding series of chuck actuator shafts, coaxial bearings for each shaft in said drive housing, means resiliently biasing each shaft toward said cam, a roller pivoted with respect to the inner end portion of each actuator shaft, an actuating arm secured to each shaft about which the chuck finger means are pivoted, means operatively connecting the outer end of each actuator shaft to the corresponding actuating arm, drive spacer means fixed to each shaft to which the chuck finger means are pivoted, means carried by the drive spacer means and normally engaged by the inner side of the corresponding chuck finger means, whereby as the drive housing rotates, the cam effects movement of the chuck actuator shafts to move the chuck finger means from articles gripped thereby against their locating slides or release said finger means to allow them to be pulled into engagement with accepted articles by the chuck finger biasing means, and means for driving all of said mechanism in synchronism.

12. Article transfer mechanism comprising means for feeding upended cylindrical articles of substantially uniform length and diameter to a selected stationary position, a first carriage mounted for rotation about a vertical axis, sets of article-gripping devices, each set comprising an inner grip finger and a pair of outer grip fingers, a shaft rotatably carrying each set of grip fingers, mounted on said carriage for rotation therewith, means for automatically operating said gripping devices during carriage rotation to take so positioned articles, one at a time, and carry them around with said carriage, a second carriage comprising a housing and mounted for rotation about a vertical axis, a series of pairs of locating plates movable with said housing and presenting radially opening notches for nesting work pieces in place, belt means for holding said work pieces against said locating plates, means for accepting said articles from the gripping devices of said first carriage for processing with respect to said work pieces, said accepting means comprising article holders and cooperating article-gripping devices mounted on said second carriage for rotation therewith, means for automatically actuating said second carriage gripping devices, said second carriage being so positioned with respect to said first carriage that, during rotation, articles are presented by said first carriage, one at a time to a second carriage article holder while its gripping device presses such presented article against said article holder and carries it therewith, and means for driving all of said mechanism in synchronism.

13. Article transfer mechanism comprising means for feeding upended cylindrical articles of substantially uniform length and diameter to a selected stationary position, a first carriage mounted for rotation about a vertical axis, article-gripping devices mounted on said carriage for rotation therewith, means for automatically operating said gripping devices during carriage rotation, said carriage being so positioned with respect to the feeding means that, during rotation of said carriage, its gripping devices take positioned articles, one at a time, and carry them around with said carriage, a second carriage comprising a housing and mounted for rotation about a vertical axis, a series of pairs of locating plates movable with said housing and presenting radially opening notches for nesting work pieces in place, belt means for holding said work pieces against said locating plates, means for accepting said articles from associated mechanism for processing with respect to said work pieces, said accepting means comprising article holders comprising a series of sets of article-holding devices, each set comprising a pair of locating plates and cooperating chuck finger means, vertical shafts which pivot the finger means of said sets, all mounted on said second carriage for rotation therewith, means for automatically actuating said second carriage finger means, said second carriage being so positioned with respect to said first carriage that, during rotation, articles are presented by said first carriage, one at a time, successively to the pairs of locating plates while their finger means press such presented article against said plates and carry them therewith, and means for driving all of said mechanism in synchronism.

14. Article transfer mechanism comprising means for feeding upended cylindrical articles of substantially uniform length to a selected position, a transfer turret mounted for rotation about a vertical axis, sets of article-gripping devices, each set comprising an inner grip finger and a pair of outer grip fingers, a shaft rotatably carrying each set of grip fingers, disposed on said turret, a fixed cam for operating said inner grip fingers and one for operating said pairs of outer grip fingers during rotation of said turret, so that its fingers take so positioned articles one at a time and carry them around said turret, a chucking turret comprising a housing and mounted for rotation about a vertical axis, a series of pairs of locating plates movable with said housing and presenting radially opening notches for nesting work pieces in place, belt means for holding said work pieces against said locating plates, means for accepting said articles from associated mechanism for processing with respect to said work pieces, said accepting means comprising a locating slide and a finger disposed on said chucking turret, a third fixed cam for operating said finger during rotation of said chucking turret, said chucking turret being so positioned with respect to said transfer turret that, during rotation, articles are placed by said transfer turret one at a time against said locating slide and said chucking turret finger presses such an article into position against said slide and carries it therewith, and means for driving all of said mechanism in synchronism.

15. Article transfer mechanism comprising a device for feeding upended glass tubular articles, one at a time to a selected position, a transfer turret mounted for rotation about a vertical axis, sets of inner and outer grip fingers disposed circumferentially on said turret, a fixed cam for operating said inner grip fingers and one for operating said outer grip fingers during turret rotation, the turret being so positioned with respect to the feeding device that, during rotation of said turret, its fingers take positioned articles one at a time and carry them around with said turret, a chucking turret comprising a housing and mounted for rotation about a vertical axis, a series of pairs of locating plates movable with said housing and presenting radially opening notches for nesting work pieces in place, belt means for holding said work pieces against said locating plates, means for accepting said articles from associated mechanism for processing with respect to said work pieces, said accepting means comprising sets of article-holding devices, each set comprising a pair of locating plates and cooperating chuck finger means, vertical shafts on which pivot the finger means of said sets, all disposed circumferentially on said chucking turret, a third fixed cam for operating said finger means during rotation of said chucking turret, said chucking turret being so positioned with respect to said transfer turret that, during rotation, said articles are placed by said transfer turret one at a time against locating plates and the finger means press them into position against said plates and carry them therewith, and means for driving all of said mechanism in synchronism.

References Cited in the file of this patent

UNITED STATES PATENTS

| | | |
|---|---|---|
| 1,133,602 | Woodland | Mar. 30, 1915 |
| 1,619,077 | Kinney | Mar. 1, 1927 |
| 1,718,240 | Kinney | June 25, 1929 |
| 2,085,615 | Taylor | June 29, 1937 |
| 2,112,119 | Rowe | Mar. 22, 1938 |
| 2,207,179 | Schreiber | July 9, 1940 |
| 2,427,712 | Casler | Sept. 23, 1947 |
| 2,468,255 | Dunn | Apr. 26, 1949 |
| 2,528,860 | Clark | Nov. 7, 1950 |
| 2,609,943 | Winder | Sept. 9, 1952 |
| 2,612,254 | Carter | Sept. 30, 1952 |
| 2,860,760 | Yeo et al. | Nov. 18, 1958 |
| 2,888,131 | Allen | May 26, 1959 |